United States Patent [19]

Kerber et al.

[11] Patent Number: 4,599,852
[45] Date of Patent: Jul. 15, 1986

[54] ADJUSTABLE LEAF SPRING SUSPENSION FOR FLEXIBLE CUTTERBAR

[75] Inventors: Dathan R. Kerber, Bollingbrook; Orlin W. Johnson, Lockport; Richard E. Benson, East Moline, all of Ill.

[73] Assignee: J. I. Case Company, Racine, Wis.

[21] Appl. No.: 758,312

[22] Filed: Jul. 24, 1985

[51] Int. Cl.⁴ ............................................. A01D 67/00
[52] U.S. Cl. ........................................ 56/15.8; 56/208
[58] Field of Search .................... 56/14.4, 15.3, 15.8, 56/208; 267/37 R, 37 A, 41, 54 R

[56] References Cited

U.S. PATENT DOCUMENTS

| | | | |
|---|---|---|---|
| 3,886,718 | 6/1975 | Talbot | 56/208 |
| 4,011,709 | 3/1977 | Mott et al. | 56/208 |
| 4,206,584 | 6/1980 | Johnson et al. | 56/15.8 |
| 4,414,793 | 11/1983 | Halls | 56/15.8 |

Primary Examiner—Gene Mancene
Assistant Examiner—David I. Tarnoff
Attorney, Agent, or Firm—Dressler, Goldsmith, Shore, Sutker & Milnamow

[57] ABSTRACT

A header for a combine or the like having a cutterbar assembly which is vertically flexible relative to the main frame of the header. Leaf springs are fixedly connected to the header frame and extend forwardly to a sliding connection with the cutterbar assembly to exert a counterbalancing upward force thereon. Longitudinally reciprocable adjustment bars captive on threaded adjustment bolts are mounted on the main frame in association with each spring for varying the upward force being exerted thereby.

9 Claims, 4 Drawing Figures

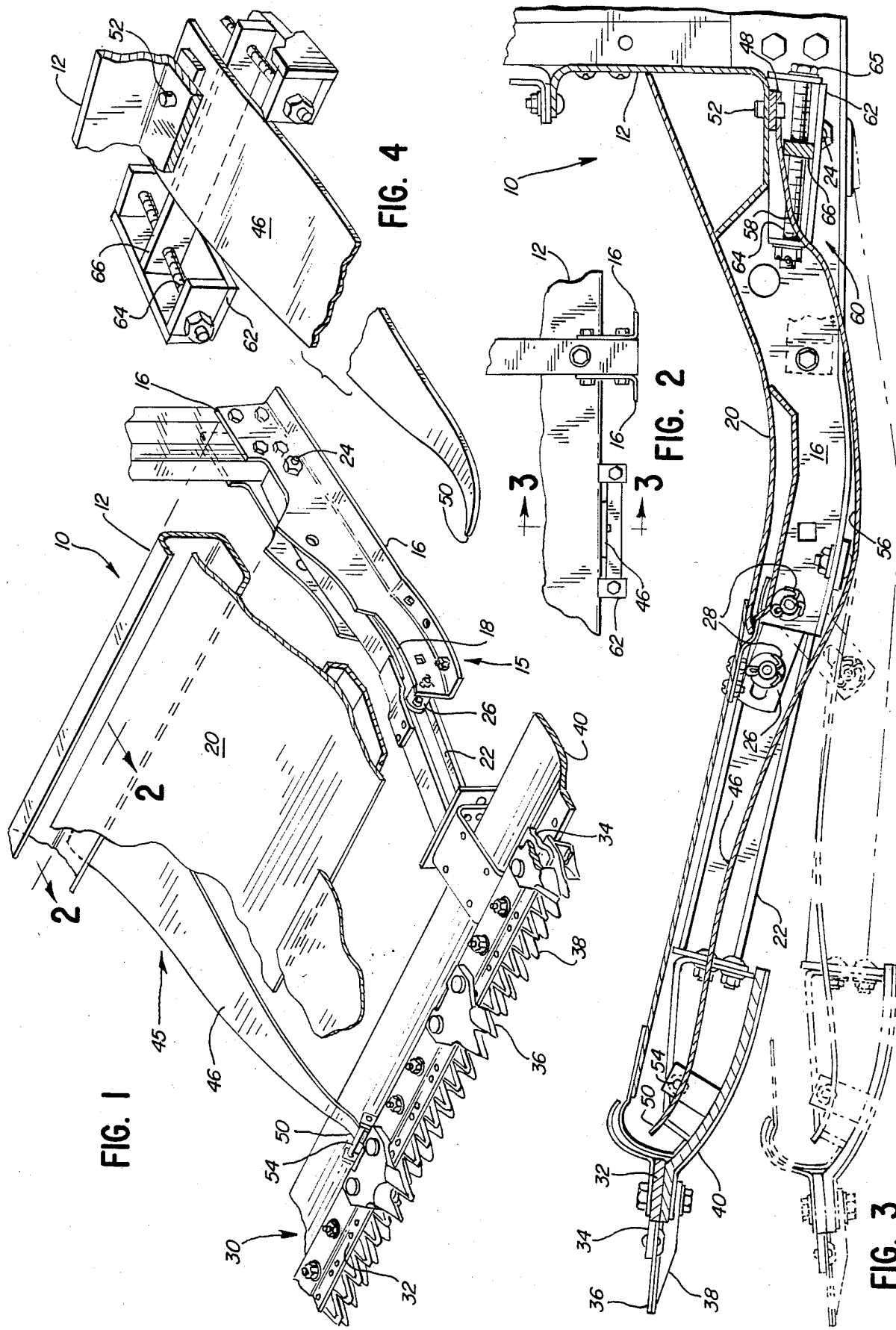

ADJUSTABLE LEAF SPRING SUSPENSION FOR FLEXIBLE CUTTERBAR

TECHNICAL FIELD

This invention relates to crop harvesting machines or vehicles, such as combines, and, more particularly, to improvements in the resilient support means for the flexible cutterbars of agricultural combines.

BACKGROUND OF THE INVENTION

In general, the various working sections of an agricultural combine may be said to include a forwardly-positioned header section which carries a cutterbar for harvesting the crop, a platform for supporting the harvested crop, a reel above the platform for raking the crop toward the cutterbar and platform, and an auger associated with the platform for combining and feeding the harvested crop on the platform rearwardly; an intermediate feeder section for conveying the crop rearwardly from the header to a threshing section; and a thresher in the threshing section for separating the main edible crop from the remaining plant parts. For efficient harvesting of low-growing crops, it is, of course, desirable to position the cutterbar as close to the ground as possible without jamming or digging into the soil.

It is well-known to provide floating or flexible cutterbars for the harvesting of low-growing crops. Such floating cutterbars are able to flex vertically to compensate for irregularities in the ground surface, while the header itself remains comparatively rigid and fixed so that the crop can be efficiently cut close to the ground. However, in order to stabilize such cutterbars and avoid damage thereto, it became necessary to apply a counterbalancing, upwardly directed force to the cutterbars.

Representative of the efforts made to supply the counterbalancing force is U.S. Pat. No. 4,091,602, which discloses a plurality of tapered leaf springs rigidly connected between the main frame of the header and the cutterbar. Those springs were upwardly bowed, and telescoping stabilizer bars were provided to prevent damage or buckling of the springs. The counterbalancing force exerted on the cutterbar was a fixed function of the spring structure and there was no means provided for adjusting that force.

U.S. Pat. No. 4,414,793 illustrates another effort to provide a counterbalancing force for a flexible cutterbar. In that structure, a plurality of upwardly bowed leaf springs are connected between an intermediate transverse bar on the header and the cutterbar. While the rearward connection to the transverse bar was rigid, the forward end of the spring made only a sliding contact with the bottom surface of the cutterbar. According to the patent's teachings, the counterbalancing force on the cutterbar could be varied by attaching a greater number of leaf springs or by stacking one spring atop another at a given point of connection. In addition to requiring additional springs, the described means for adjusting the counterbalancing force was cumbersome and imprecise at best.

There thus exists a need for a counterbalancing support for the flexible cutterbars of combines which is readily adjustable as required to compensate for varying conditions of ground surface, nature of crop, and load applied to the header.

SUMMARY OF THE INVENTION

The present invention provides a spring suspension system for the flexible cutterbar assembly of a combine which is readily adjustable and reduces or eliminates the problems encountered with previous such systems.

In general, the suspension system comprises a plurality of leaf springs connected between the main frame of the header and the cutterbar. Each of the springs is generally concave in the longitudinal direction, but also includes a slightly upwardly curved rear segment to effect a shallow sinusoidal configuration. At its front, the spring is positioned through an eyelet mounted from the top surface of a member of the cutterbar assembly in free sliding contact with said cutterbar assembly member. At its rear, the spring is fixedly attached to a pin on the header main frame.

Tension adjustment means is associated with the curved rear segment of the spring. The adjustment means comprises a rod or bar threadedly carried on a pair of rotatable adjustment bolts. The bar supports, and is in direct contact with, the curved rear portion of the spring, and is thereby reciprocably captive on the bolts. When the bolts are turned, the bar moves fore or aft against the curved segment of the spring. As a result, the fulcrum or pivot point of the spring arm is changed with a resulting change in the counterbalancing force applied thereby to the cutterbar assembly.

The bolts may be readily rotated with a common wrench, and varying pivot points may be selected for the separate and different springs as desired. The invention thereby provides for the cutterbar a suspension system with substantially infinite adjustability.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numbers are employed to designate like parts throughout the same, FIG. 1 is a fragmentary perspective view of a portion of a combine header illustrating the relationship of a leaf spring to the cutterbar assembly and embodying the principles of the invention;

FIG. 2 is a fragmentary rear view of the header main frame taken substantially on the plane of line 2—2 in FIG. 1;

FIG. 3 is an enlarged vertical sectional view taken substantially on the plane of line 3—3 in FIG. 2; and FIG. 4 is a fragmentary perspective view of a leaf spring and its associated adjustment means.

DETAILED DESCRIPTION OF THE INVENTION

Referring with greater particularity to the various Figures of the drawings, the reference numeral 10 indicates generally a header frame (shown fragmentarily) with which the present invention is adapted to be incorporated. The header frame 10 comprises a main transverse beam 12 and a plurality of support beams 15 connected to and extending forwardly from the transverse beam 12. While only one support beam 15 has been illustrated and will be described, it should be understood that the header 10 will include a plurality of such beams, the actual number depending on the width and design of the header.

Support beam 15 comprises a pair of opposed, relatively short, L-shaped beams 16, 16, rigidly connected to the transverse beam 12, said L-shaped beams including a concavely curved top edge 18 for supporting thereon the trough-like platform 20 onto which the severed crop material is collected for further rearward transport by a rotating auger positioned thereabove. An elongated I-beam 22 is pivotally mounted at 24 between the pair of L-shaped beams and is thereby capable of limited vertical movement with relation to the transverse beam 12 about the pivot point 24. The limit of the vertical movement is determined by a slotted strap and pin connection 26, 28, between the I-beam 22 and the forward edge of the fixed L-shaped beam 16.

A cutterbar assembly 30 is rigidly connected to the forward edge of the plurality of I-beams 22 so that said cutterbar assembly is capable of the limited up and down movement already described. The cutterbar assembly 30 is of generally conventional construction and comprises a stationary cutterbar 32, a reciprocable knife drive bar 34 to which is connected a plurality of sickle blades or knives 36, and a plurality of stationary knife guards 38 against which the knives act to sever the standing crops. A stationary skid member 40 is likewise connected to the cutterbar assembly 30 for contacting the ground during harvesting operations.

A counterbalancing force for resiliently supporting the substantial weight of the cutterbar assembly 30 and skid 40 is provided by a plurality of adjustable spring assemblies 45. Spring assembly 45 comprises a leaf spring 46 having a relatively broad rearward portion 48 and tapering forwardly to a relatively narrow front tip 50. Rearwardly, the leaf spring 46 is fixedly mounted from the transverse beam 12 with a mounting pin 52. The front tip 50 of the spring 46 is slidably received through an eyelet 54 which is secured to the top surface of the skid 40. As seen best in FIG. 3 of the drawing, the leaf spring 46 has a generally sinusoidal configuration and comprises an intermediate concave segment 56 in substantial parallelism with the concave platform 20 and an upwardly curved rear segment 58. It will thus be appreciated that the rear end connection of the spring 46 from the beam 12 and the freely sliding connection of the front of the spring with the skid 40 provides a resilient cantilever support for the cutter assembly 30 with relation to the beam 12.

Adjustment means 60 is associated with the spring 46 for varying the counterbalancing force exerted by the spring on the cutter assembly 30. Adjustment means 60 comprises a pair of opposed block members 62, 62 rigidly depending from the beam 12 with the spring 46 therebetween. A threaded bolt 64 is rotatably mounted in each of the block members 62 and said bolts are threadedly engaged through a support bar 66 supported between the block members. Since the support bar 66 is captive on the bolts 64, rotation of said bolts by means of a common wrench applied to the bolt heads 65 will cause the bar to move fore or aft.

It is important to note that the spring 46 and, more particularly, the upwardly curved rear segment 58 thereof, rests directly on and is supported by the support bar 66. Support bar 66 thereby provides a pivot axis for the resilient spring separate from the pivot point 24 of the rigid L-shaped beam 16. Accordingly, adjustment of the position of the support bar 66 results in an adjustment of the counterbalancing force exerted by the spring 46 on the cutterbar assembly 30.

It will, of course, be appreciated that a plurality of spring assemblies 45 and associated adjustment means 60 will be spaced along the width of the header frame 10, preferably one between each pair of support beams 15. Virtually unlimited adjustment of the resilient support of the cutterbar assembly 30 may thus be obtained as operating conditions warrant.

It will be readily observed from the foregoing detailed description of the invention and illustrative embodiment thereof that numerous variations and modifications may be effected by those skilled in the art without departing from the true spirit and scope of the novel concept of the principles of the invention.

What is claimed is:

1. A header attachable to a combine or the like for harvesting a standing crop comprising:
   a header frame;
   a cutter bar mounted on said frame for vertical movement relative thereto to maintain a close-cutting relation to the ground to cut the standing crop as the header is moved parallel to the ground;
   a plurality of spaced leaf springs mounted at their rearward end to said header frame and respectively extending forwardly to exert a lifting force on said cutterbar assembly to resiliently support the same for vertical movement relative to said frame, each leaf spring being connected to said cutterbar assembly with a fore-and-aft sliding connection enabling said cutterbar assembly to shift relative to said springs; and
   adjustment means associated with each leaf spring adjacent the rearward end thereof having a fulcrum point longitudinally movable beneath said leaf springs for varying the lifting force exerted thereby on said cutterbar assembly,
   each of said springs being downwardly bowed over a substantial portion of the forwardly extending length thereof, the rearward end portion of each of said springs curving upwardly in opposed relation to the downwardly bowed portion thereof.

2. A header according to claim 1 wherein said adjustment means is in weight-bearing contact with the upwardly curved rear portion thereof, said means being longitudinally movable beneath said curved rear portion.

3. A header according to claim 2 wherein said adjustment means comprises a rigid bar supported transversely of said rear portion, and rotatable threaded means for adjustably moving said bar longitudinally of said rear portion.

4. A header attachable to a combine or the like for harvesting a standing crop comprising:
   a header frame;
   a cutterbar assembly mounted on said frame for vertical movement relative thereto to maintain a close-cutting relation to the ground to cut the standing crop as the header is moved parallel to the ground;
   a plurality of spaced leaf springs mounted at their rearward end to said header frame and respectively extending forwardly to exert a lifting force on said cutterbar assembly to resiliently support the same for vertical movement relative to said frame, each leaf spring being connected to said cutterbar assembly with a fore-and-aft sliding connection enabling said cutterbar assembly to shift relative to said springs; and
   adjustment means associated with each leaf spring adjacent the rearward end thereof having a fulcrum point longitudinally movable beneath said leaf springs for varying the lifting force exerted thereby on said cutterbar assembly, said cutterbar assembly comprising bottom skid means, the forward end of each of said leaf springs being slidably connected to said skid means.

5. In a header for harvesting a standing crop and including a header frame and a cutterbar assembly:

means mounting said cutterbar assembly for vertical movement relative to said frame about a first pivot axis to maintain a close-cutting relation to the ground;

a plurality of leaf springs secured to said frame adjacent said first pivot axis and extending forwardly to exert a lifting force on said cutterbar assembly to resiliently support the same during movement about said first pivot axis;

means mounting said leaf springs on said frame for up and down flexure about an effective second pivot axis spaced forwardly of said first pivot axis;

means coupling the forward ends of said leaf springs to said cutterbar assembly with a sliding connection to accommodate up and down movement of the cutterbar assembly and the leaf springs about their respective pivot axes; and adjustment means associated with said leaf springs for varying the lifting force exerted thereby on said cutterbar by having said second pivot axis longitudinal movable beneath said leaf springs.

6. In the header of claim 5, said leaf springs being mounted adjacent their rear ends to said frame, said adjustment means cooperating with said rear ends to provide said second pivot axis.

7. In the header of claim 6, said adjustment means comprising a rigid bar positioned on said frame in weight-bearing contact with the rear end of each of said springs, and threaded means for selectively moving said bar longitudinally of said rear end.

8. In the header of claim 7, portions of said springs extending forwardly of said rear ends being downwardly bowed, and a downwardly bowed platform on said header in substantial parallelism with said springs.

9. In the header of claim 8, said cutterbar assembly comprising depending skid means, said sliding connection of said leaf springs being with said skid means.

* * * * *